May 6, 1969 — S. R. BRANDELL — 3,443,065
MULTIPLE OUTPUT ELECTRIC HEATER APPARATUS
Filed Oct. 12, 1967

INVENTOR
S. R. BRANDELL
BY MARN & JANGARATHIS
ATTORNEYS

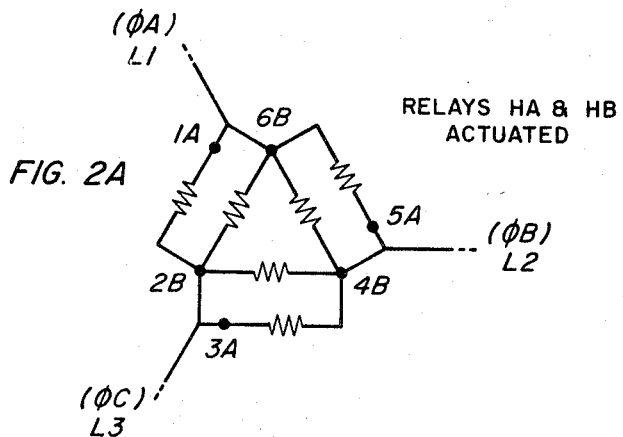
FIG. 2A — RELAYS HA & HB ACTUATED
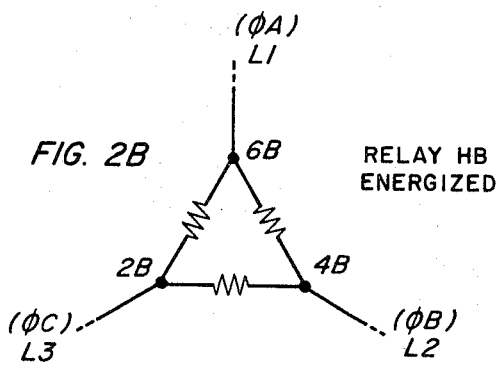
FIG. 2B — RELAY HB ENERGIZED
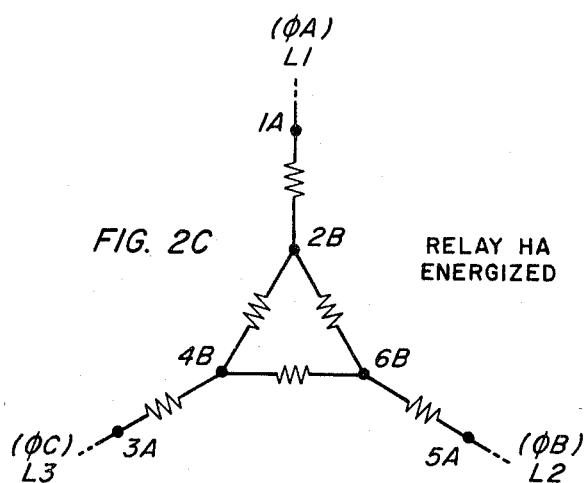
FIG. 2C — RELAY HA ENERGIZED Uni*ted States Patent Office 3,443,065
Patented May 6, 1969

3,443,065
MULTIPLE OUTPUT ELECTRIC HEATER APPARATUS
Sol R. Brandell, New York, N.Y., assignor to American Hydrotherm Corporation, New York, N.Y.
Filed Oct. 12, 1967, Ser. No. 674,953
Int. Cl. H05b 1/02
U.S. Cl. 219—515                                                       12 Claims

ABSTRACT OF THE DISCLOSURE

The heating elements of an electric heater are provided with electromagnetically operated, multiple switch contacts to provide three separate and distinct heating element configurations. These configurations are utilized to achieve three separate and distinct power levels for the heater.

---

This invention relates to a balanced load, three-phase electric heater and more particularly to switching apparatus utilized in combination therewith to obtain a new triple-output, three-phase electric heater.

It is an object of this invention to provide a new triple-output, three-phase electric heater with a maximum step-down ratio of eight-to-one.

Prior multiple-output electric heaters have had the attendant disadvantage that in order to change their output from full rated power to minimum power output it was necessary to pass through each intervening output level. Therefore, it is a further object to provide a new triple-output, three-phase electric heater in which the output may be changed abruptly from maximum rated power to the lowest available output without passing through any intervening output power level.

Furthermore, it is an object of this invention to provide a multiple-output, balanced load, three-phase electric heater whose output may be abruptly changed from any given power output to any other given power output without the necessity for passing through, even temporarily, intervening power levels.

Previous switchable output electric heating devices have generally utilized expensive and often, due to the large amount of equipment needed, unreliable switching devices such as variable-voltage transformers, variable tapped transformers or saturable reactor devices in combination with D.C. operated magnetic amplifiers. Therefore, it is a further object to provide a new triple-output, three-phase electric heater which utilizes efficient, inexpensive and highly reliable switching devices to provide the various outputs therefor.

A further object is to use various combinations of the resistor elements selected by actuation of various switch elements to provide the desired power output of the heater.

In accordance with the above-specified objectives, a three-phase, balanced line voltage electric heater load is provided having a first set of impedance elements connected in a delta configuration having three junction points, a second set of three impedance elements each of which is connected on a first side to one of said junction points, a source of three-phase alternating voltage, first means connecting one phase of said source to each junction point via a first switch means, said first switch means comprising a plurality of switch contacts each of which is jointly actuated upon the receipt of a first control signal by said first switch means; and second means connecting one phase of said source to each impedance element of said second set on a second side via a second switch means, said second switch means comprising a plurality of switch contacts each of which is jointly actuated upon the receipt of a second control signal by said second switch means; said second switch means being effective when actuated to provide the heater with maximum rated power when said first switch means is also actuated, said second switch means being effective when actuated to provide only one-eighth rated power when said first switch means is in the deactivated condition, and said first switch means when actuated being effective to provide the heater with one-half rated power when said second switch means is in the deactivated condition.

Other objects and advantages of this invention will be apparent from an inspection of this specification, the claims and the accompanying drawing of which:

FIGS. 2A–2C show the effective FIG. 2 heater section with the switches in various positions.

Figure 1:
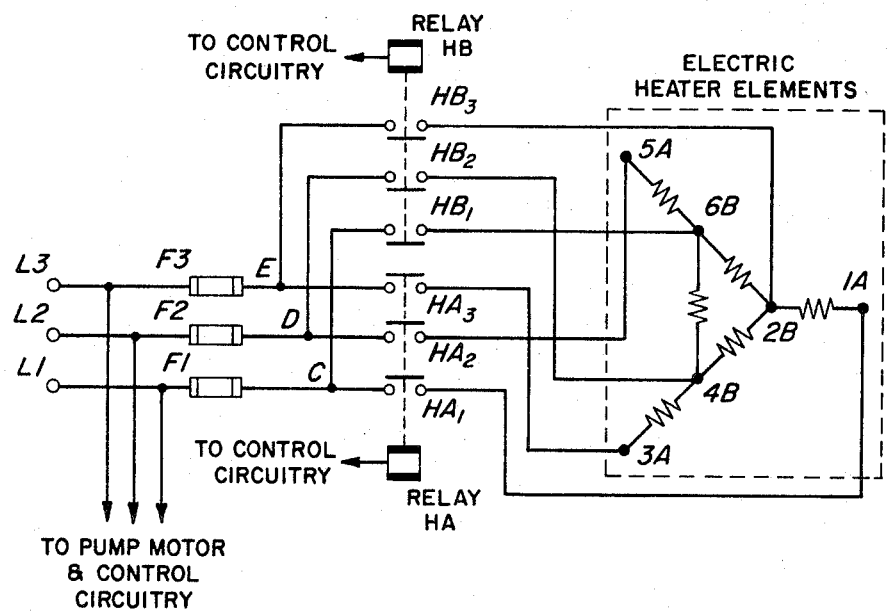
FIG. 1 is a diagram of a preferred embodiment of the instant invention.

Referring to the drawing FIG. 1 shows a diagram of a preferred embodiment of the instant invention. The electric heater elements which are enclosed within the dashed lines consist of six impedance elements R of equal resistance. Three of these impedance elements are connected together to form a delta configuration whose junction points are marked 2B, 4B and 6B wherein the B indicates that each is connected to one set of contacts of switch means HB. Additionally connected to each of the junction points is an impedance element R which is connected between its respective junction point and a further terminal which terminals are marked 1A, 3A and 5A wherein the A indicates that each is connected to one set of contacts of switch means HA.

Each of the switch means HB or HA is preferably an electromagnetic relay; however, any well-known switching expedient may be used without deviating from the scope of this invention. The switch means are shown as relays HB and HA, each having three sets of contacts each of which is energized when the relay is energized. Each relay is energized by external control circuitry which is not shown and does not form any part of this invention. These relays are programmed via this control circuitry to operate from a three-step temperature controller which also is not shown. As will be shown hereinafter, the relays determined whether the heater section operates at full rated power, one-half rated power, one-eighth rated power or receives no rated power.

The six terminals 1–6 of the heater section are energized by a three-phase, alternating voltage source which is connected to terminals L1–L3. Each phase thereof is transmitted via the respective protective devices $F_1$–$F_3$ to its respective line terminal C–E. The line terminals C–E are each connected via suitable conductor means to one commonly located contact set of each of the relays HA and HB. Thus, line 1 and terminal C are connected to both contact sets $HA_1$ and $HB_1$, line 2 and terminal D are connected to both contact sets $HA_2$ and $HB_2$, and line 3 and terminal E are connected to both contact sets $HA_3$ and $HB_3$. The other side of each relay contact set is connected to one junction point or one terminal within the heater section. As previously noted, all of the contact sets of relay HB connected to junction points of the delta configuration, i.e., 2B, 4B and 6B, while all of the contact sets of relay HA connect to the second side of resistor elements which are connected to junction points, i.e., 1A, 3A and 5A. Therefore, it can be seen that the precise impedance element configuration is determined by the energization state of both relays.

Figure 2:
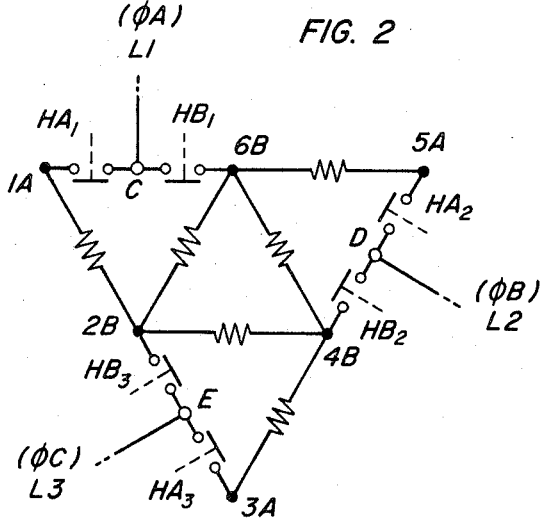
FIG. 2 is a showing of the heater section of FIG. 1 with the wires shortened accordingly to show the switch elements in the proper relationship with both the inputs to the heater elements and the individual resistor elements therein.

FIG. 2 shows the impedance elements of the heater section of FIG. 1, together with the line terminals C–E, the relay contact sets $HA_1$–$HA_3$ and $HB_1$–$HB_3$, the impedance terminals 1A, 3A and 5A, and the delta junction points 2B, 4B and 6B. The conductor means however, have been suitably shortened so that the true effect, on the overall load configuration, of the various relay contact sets can be easily observed and appreciated. It should further be noted that the line connected to the respective line terminals together with the voltage phase therein has been generally indicated as connected to each terminal.

As can be readily seen, when both the relays HA and HB are in the deenergized condition with the contact sets as shown, no voltage is applied to the heating element section. Thus, in this case the heating element section is deenergized.

When both relays HA and HB are energized all of the contact sets shown in FIG. 2 are closed and the impedance element configuration is as shown in FIG. 2A. This configuration is the delta configuration with an impedance element in parallel with each arm of the delta. Thus, the equivalent impedance of each arm of the delta in the purely resistive case is one-half, since all the resistors are of equal value, and the heater section is at maximum rated power. The power in this case may be expressed as:

$$P_A = 3\left[\frac{V^2}{1/2R}\right] = 6\frac{V^2}{R}$$

wherein P is equal to the total power designated, V is the voltage per phase and R is the resistance per phase.

When only relay HB is energized while HA is deenergized, the impedance element configuration is shown in FIG. 2B. It should be noted that the open circuited impedance elements which reside in FIG. 2 between terminal 1A and junction point 2B, terminal 3A and junction point 4B, and terminal 5A and junction point 6B have been removed in FIG. 2B for increased clarity. With these elements removed, it is apparent that the impedance element configuration is an ordinary delta wherein each arm has an impedance R. Thus, under these conditions, again assuming the purely resistive case, the heater section is at one-half maximum rated power. This power may be expressed as:

$$P_B = 3\left[\frac{V^2}{R}\right] = 3\frac{V^2}{R}$$

wherein the letter designations are the same as stated above.

When only relay HA is energized while relay HB is unenergized, the contact sets $HA_1$–$HA_3$ shown in FIG. 2 are closed while contact sets $HB_1$–$HB_3$ remain open. The impedance element configuration is then as shown in FIG. 2C. In this case, it will be noted, there is one impedance element of a value R in series with each junction point of the delta configuration. The power under this condition, again assuming the purely resistive case, is most easily determined by changing the delta configuration to a Y configuration. This can be done by using the known relationships of a balanced line that (1) the voltage per phase in a Y equals the quantity one over the square root of three times the line voltage or the phase voltage of the delta and (2) the phase impedance of the delta. Thus, the power of the overall configuration may then be expressed as:

$$P_c = 3\left[\frac{\left(\frac{V}{\sqrt{3}}\right)^2}{R+1/3R}\right] = 3/4\frac{V^2}{R}$$

Thus, this impedance element configuration provides one-eighth rated power.

Therefore, it can be seen that depending on the state of relays HA and HB three separate power outputs are available, namely:

(1) Maximum rated power,
(2) One-half rated power, or
(3) One-eighth rated power.

Furthermore, the condition of the relays HA and HB can be changed to any state at any given time and therefore one output can be changed to another without passing through any intervening state or awaiting the satisfaction of any predetermined condition. Additionally, the switching system utilized is simple, inexpensive and highly reliable.

As can be seen from the foregoing description, an improved three-phase, balanced load with a maximum step-down ratio of eight-to-one has been described. The embodiment shown is an example of a structural arrangement in which the novel concepts disclosed herein may be utilized.

It will be apparent to those skilled in the art that certain modifications may be made to the arrangement disclosed which remains within the spirit of the invention as defined by the appended claims.

What is claimed is:

1. A three-phase, balanced line voltage electric load comprising:
   a first set of impedance elements, said first set including at least three impedance elements connected in a delta configuration having three junction connections therein;
   a second set of impedance elements, said second set including at least three impedance elements;
   means connecting a first terminal of each impedance element of said second set to at least one of said junction connections, each of said junction connections having at least one of said impedance elements of said second set connected thereto;
   input means adapted for the connection to a source of three-phase alternating voltage;
   connecting means for transmitting one phase of said source of voltage from said input means to each of said junction connections and to a second terminal of each impedance element of said second set, each of said junction connections and each of said second terminals of each impedance element of said second set having one phase of said source from said input means connected thereto; and
   switch means interposed between the connecting means for each phase from said input means and the impedance load connected thereto, said switch means being solely responsive to external control signals applied thereto and independent of the voltage of said source.

2. The combination defined in claim 1 wherein:
   said connecting means comprises first and second means, said first means transmitting one phase of said source from said input means to each of said junction conections and said second means transmitting one phase of said source from said input means to each of said second terminals of each impedance element of said second set; and
   said switch means comprises first and second switch means, said first switch means being interposed between said first connecting means for each phase and the junction connection connected thereto and said second switch means being interposed between said second connecting means for each phase and said second terminal connected thereto.

3. The combination defined in claim 1 wherein a group of said switch means are jointly responsive to the same control signal.

4. The combination defined by claim 3 wherein there are present at least two of said jointly responsive groups.

5. The combination defined in claim 2 wherein all of said first switch means are jointly responsive to the same control signal.

6. The combination defined in claim 2 wherein all of said second switch means are jointly responsive to the same control signal.

7. The combination defined in claim 2 wherein all of said first switch means are jointly responsive to a first control signal and all of said second switch means are jointly responsive to a second control signal.

8. The combination defined in claim 2 wherein if both of said first and second switch means are in the actuated position the load will dissipate maximum rated power and at least one impedance of said second set is in parallel with each impedance of said first set.

9. The combination defined in claim 2 wherein if only said first switch means are activated while said second switch means are deactivated, the load will dissipate one-half rated power and said second set of impedance elements are electrically disconnected from the load circuit.

10. The combination defined in claim 2 wherein if only said second switch means are actuated while said first switch means are deactivated, the load will dissipate one-eighth rated power and at least one impedance element of said second set is in series with each of said junction connections.

11. The combination of claim 7 wherein:
all of said impedance elements have substantially the same value of resistance;
if both of said first and second switch means are in the activated position the load will dissipate maximum rated power and an impedance element of said second set is in parallel with each impedance element of said first set;
if only said first switch means are activated while said second switch means are deactivated, the load will dissipate one-half rated power and said second set of impedance elements are electrically disconnected from the load circuit; and
if only said second switch means are activated while said first switch means are deactivated, the load will dissipate one-eighth rated power and at least one impedance element of said second set is in series with each of said junction connections.

12. A switching system for a three-phase, balanced line voltage electric heater load comprising:
at least six impedance elements, three of said elements connected together in a configuration having at least three terminals therein, at least one of the remaining impedance elements connected to each of said terminals on a first side;
an input connector for the connection of one wire of a three-wire system connected to each of said three terminals;
a first switch means interposed between each of said input connectors and each of said three terminals;
means connecting an input connector to each of said remaining impedance elements on a second side thereof; and
second switch means interposed between each of said input connectors and said connecting means, said second switch means effective when actuated, when said first switch means are in the closed position to place one of said remaining impedance elements in parallel across each one of said three impedance elements, and said second switch means effective when actuated, when said first switch means are in the open position, to place at least one of said remaining impedance elements in series with each of said terminals.

References Cited

UNITED STATES PATENTS

| | | | |
|---|---|---|---|
| 2,801,318 | 7/1957 | Crowley | 219—515 |
| 2,841,681 | 7/1958 | Negromanti | 219—515 |
| 3,257,544 | 6/1966 | Benjamin | 219—515 |

BERNARD A. GILHEANY, *Primary Examiner.*

FRED E. BELL, *Assistant Examiner.*

U.S. Cl. X.R.

307—38